US009064477B2

(12) United States Patent
Lawrence

(10) Patent No.: US 9,064,477 B2
(45) Date of Patent: *Jun. 23, 2015

(54) SYSTEM AND METHOD FOR SPRITE CAPTURE AND REPRODUCTION

(71) Applicant: Bally Gaming, Inc., Las Vegas, NV (US)

(72) Inventor: James Lawrence, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,519

(22) Filed: Oct. 17, 2014

(65) Prior Publication Data

US 2015/0035845 A1 Feb. 5, 2015

Related U.S. Application Data

(63) Continuation of application No. 12/617,681, filed on Nov. 12, 2009, now Pat. No. 8,866,834.

(51) Int. Cl.
| | |
|---|---|
| G09G 5/00 | (2006.01) |
| G09G 5/42 | (2006.01) |
| G06T 13/80 | (2011.01) |
| A63F 13/52 | (2014.01) |
| A63F 13/55 | (2014.01) |
| G06T 11/00 | (2006.01) |
| G06T 15/04 | (2011.01) |

(52) U.S. Cl.
CPC .. *G09G 5/42* (2013.01); *G09G 5/00* (2013.01); *G06T 13/80* (2013.01); *A63F 13/52* (2014.09); *A63F 13/55* (2014.09); *G06T 11/001* (2013.01); *G06T 15/04* (2013.01)

(58) Field of Classification Search
CPC ..................... A63F 2003/00842; G06T 15/04
USPC ......... 345/629, 419, 522, 582; 710/8; 463/40, 463/30; 382/235
See application file for complete search history.

(56) References Cited

U.S. PATENT DOCUMENTS

| | | | |
|---|---|---|---|
| 5,982,398 A | 11/1999 | Yamamoto | |
| 6,037,988 A * | 3/2000 | Gu et al. ................... | 375/240.16 |
| 7,054,496 B2 | 5/2006 | Miceli et al. | |
| 7,480,743 B2 | 1/2009 | Yu et al. | |
| 7,916,147 B2 | 3/2011 | Clemie et al. | |
| 2004/0077404 A1 | 4/2004 | Schlottmann et al. | |
| 2004/0104916 A1 | 6/2004 | Hong et al. | |
| 2006/0077208 A1* | 4/2006 | Aoki ............................ | 345/582 |
| 2006/0202985 A1 | 9/2006 | Kobayashi et al. | |

(Continued)

*Primary Examiner* — Phi Hoang
(74) *Attorney, Agent, or Firm* — Brooke W. Quist; Marvin A. Hein; Philip J. Anderson

(57) ABSTRACT

A sprite capture and reproduction system for a gaming machine is disclosed. The system includes a sprite capture component and a sprite reproduction component. The sprite capture component enables capture of a sprite in video memory for use as another sprite. The sprite reproduction component enables reproduction of independent animated images that are combinable in a larger animation. The system does not require a discrete texture for each and every image that is loaded. In some cases, images may be compresses, further reducing video memory requirements. Additionally, the system dramatically increases likelihood that desired images are resident and available for use in video memory, thereby saving texture memory. Further, the system minimizes shadow RAM usage.

10 Claims, 7 Drawing Sheets

(56) References Cited

U.S. PATENT DOCUMENTS

| | | |
|---|---|---|
| 2007/0019003 A1 | 1/2007 | Imai et al. |
| 2007/0115288 A1 | 5/2007 | Cronin et al. |
| 2008/0171597 A1 | 7/2008 | Anderson et al. |
| 2010/0105454 A1 | 4/2010 | Weber et al. |

* cited by examiner

SYSTEM AND METHOD FOR SPRITE CAPTURE AND REPRODUCTION

CROSS-REFERENCE TO RELATED APPLICATIONS

This application is a continuation of U.S. patent application Ser. No. 12/617,681, filed Nov. 12, 2009, which is incorporated herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates generally to a gaming system and, more particularly, to a system and methodology for providing enhanced video capabilities without significantly increasing CPU usage or memory requirements.

BACKGROUND

Video can use a large amount of memory in gaming applications. In this regard, newer and more advanced video technologies can require even larger amounts of memory. Such large memory requirements can dramatically increase overall costs and efficiency. Traditionally, every image loaded requires a texture, which draws memory, typically from video memory. Using video memory needlessly drains this limited resource away from other applications that are of a higher priority to gaming systems. Accordingly, it would be desirable to use more advanced video technologies with the same or lower memory requirements as legacy server.

SUMMARY

Briefly, and in general terms, various embodiments are directed to a sprite capture and reproduction system for a gaming machine. A sprite is a graphic image that can move within a larger graphic image. The system includes a sprite capture component and a sprite reproduction component. The sprite capture component enables capture of a sprite in video memory for use as another sprite. The sprite reproduction component enables reproduction of independent, animated images that are combinable in a larger animation. In some cases, the sprite may include a compressed image. The system does not require a discrete texture for each and every image that is loaded. Additionally, the system dramatically increases the likelihood that the desired images are resident and available for use in video memory, thereby saving texture memory. Further, the system minimizes shadow RAM usage.

In one embodiment of the sprite capture and reproduction system, the system enables games to use advanced video technologies while maintaining the same or even lower memory usage than with a legacy video server. This is achieved through the use of enhanced texture management. Moreover, the system enables game applications to use an image on a shared texture, thereby reducing the memory usage. Additionally, by saving video memory for more intensive video and graphic image content, operating performance may be increased by using the sprite capture and reproduction system.

Other features and advantages will become apparent from the following detailed description, taken in conjunction with the accompanying drawings, which illustrate by way of example, the features of the various embodiments.

DETAILED DESCRIPTION

Figure 1:
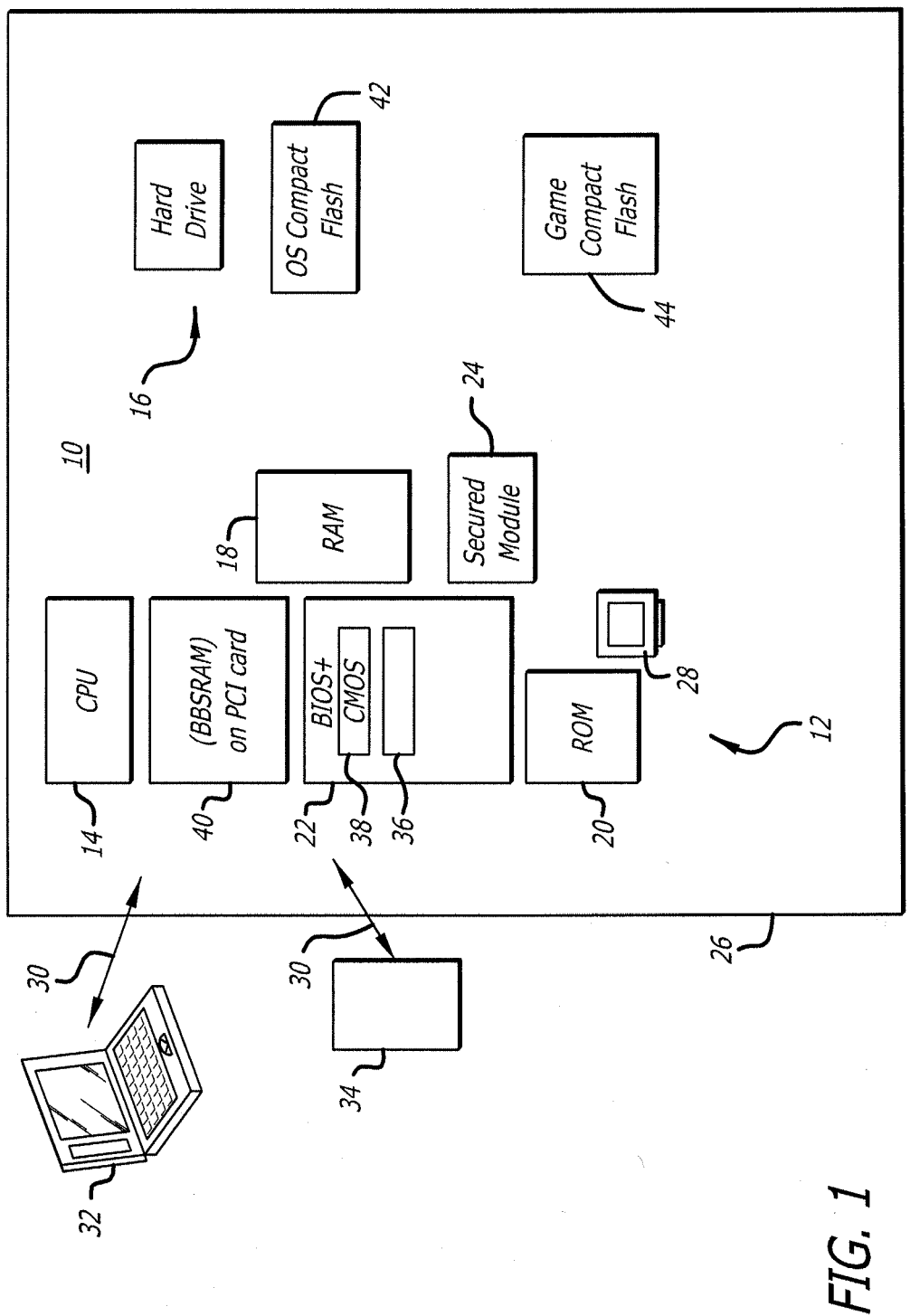
FIG. 1 illustrates a block diagram of the components of a gaming device.

Various embodiments disclosed herein are directed to gaming devices having a system and method for Sprite Capture and Reproduction. In computer graphics, a Sprite is an image or animation that is integrated into a larger scene (i.e., a graphic image that can move within a larger graphic). Animation software that supports sprites enables a designer to develop independent animated images that can then be combined in a larger animation. The Sprite Capture and Reproduction System removes the requirement from more advanced video technologies of a texture for each and every image loaded. Textures require a lot of memory, even in the rare cases when texture compression is used. This texture memory is expensive and not always needed. By saving texture memory, the Sprite Capture and Reproduction System dramatically increases the likelihood that desired images are resident in video memory. The Sprite Capture and Reproduction System also saves on shadow RAM usage. The Sprite Capture and Reproduction System has the ability to capture one sprite to another.

In one embodiment, the Sprite Capture and Reproduction System is a sprite canvas API that provides a software interface for games to render to an area of a graphics memory which is referred to as a "canvas." Prior to the advent of the Sprite Capture and Reproduction System, video services used a canvas for each and every bitmap, which was wasteful of memory. The Sprite Capture and Reproduction System abstracts away the exact memory address upon which to be written. Unfortunately, without an API to the graphics card's memory, each and every BINK requires a canvas (e.g., video card memory) and texture memory (RAM). The Sprite Capture and Reproduction System, which comprises a canvas API, saves memory by providing an API to programmatically control and reduce the number of canvases and/or textures needed for a game application. For example, if a game has 50 pay-lines images at 10K apiece, then instead of needing 500K of video memory only 10K is needed.

By utilizing better texture management, the Sprite Capture and Reproduction System enables games to use advanced video technologies with the same or even lower memory usage than the legacy video server. This is achieved, at least in part, by removing the requirement of a texture for each and every image loaded. The Sprite Capture and Reproduction System enables game applications to use an image on a shared texture, thus reducing the memory usage. Moreover, by saving video memory for more intensive content, the performance may actually increase. Referring now to the drawings, wherein like reference numerals denote like or corresponding parts throughout the drawings and, more particularly to FIGS. 1-6, there are shown various embodiments of a gaming system employing a Sprite Capture and Reproduction System.

FIG. 1 illustrates a block diagram of the components 12 of a gaming device 10. The components 12 comprise, for example, and not by way of limitation, software or data file components, firmware components, hardware components, or structural components of the gaming machine 10. These components include, without limitation, one or more processors 14, a hard disk device 16, volatile storage media such as random access memories (RAMs) 18, read-only memories (ROMs) 20 or electrically-erasable, programmable ROMs (EEPROMS) such as basic input/output systems (BIOS) 22. Additionally, the gaming device 10 includes a secured module 24. The secured module is a hardware component that is one-time programmable. One or more security algorithms may be provided on the secured module. The security algorithm generates a challenge (e.g., generates a random number), calculates an expected response to the challenge, and determines the validity of the BIOS based on the response to the challenge provided by the BIOS. In one embodiment, the secured module is a field-programmable gate array (FPGA). In another embodiment, the secured module is a trusted platform module (TPM).

In one embodiment, components 12 also include data files (which are any collection of data, including executable programs in binary or script form, and the information those programs operate upon), gaming machine cabinets (housings) 26, displays 28, or compact disk read-only memory (CDROM) or CD read-write (CR-RW) storage. In one embodiment, the data files may include data storage files, software program files, operating system files, and file allocation tables or structures. Ports 30 are included with the gaming machine 10 for connection to diagnostic systems 32 and other input/output devices 34. In one embodiment, the ports 30 each comprise a serial port, universal serial bus (USB) port, parallel port or any other type of known port, including a wireless port. Preferably, each of the components 12 have embedded or loaded in them identification numbers or strings that can be accessed by the processor 14, including the processor 14 itself, which are utilized for authentication as explained below. In one embodiment, the components that are data files each use their file path and name as their identification number or string.

Either within the gaming machine 10, or in the diagnostic system 32 attachable to the gaming machine 10, are executable instructions or a software program 36 for authentication of the components (authentication software 36), which itself may be one of the components 12 to authenticate if it is internal to the gaming machine 10. In one embodiment, authentication software 36 is stored on a persistent storage media such as the hard disk device 16, ROM 20, EEPROM, in a complementary metal oxide semiconductor memory (CMOS) 38, in safe RAM comprising a battery-backed static random access memory (BBSRAM) 40, in flash memory components 42, 44, or other type of persistent memory. In one embodiment, the authentication software 36 is stored in a basic input/output system (BIOS) 22 device or chip. BIOS chips 22 have been used for storing prior authentication software, such as previous versions of the BIOS+ chip used by Bally Gaming Systems, Inc. of Las Vegas, Nev. in their EVO gaming system. Placing the authentication software 36 in the BIOS 22 is advantageous because the code in the BIOS 22 is usually the first code executed upon boot or start-up of the gaming machine 10, making it hard to bypass the authentication process. Alternatively, in one embodiment, the authentication software 36 is stored in a firmware hub (FWH), such as Intel's 82802 FWH.

As alternative, instead of, or in conjunction with, the hard disk device, another mass storage device is used, such as a CD-ROM, CD-RW device, a WORM device, a floppy disk device, a removable type of hard disk device, a ZIP disk device, a JAZZ disk device, a DVD device, a removable flash memory device, or a hard card type of hard disk device.

It should be noted that the term, gaming device, is intended to encompass any type of gaming machine, including handheld devices used as gaming machines such as cellular based devices (e.g. phones), PDAs, or the like. The gaming device can be represented by any network node that can implement a game and is not limited to cabinet based machines. The system has equal applicability to gaming machines implemented as part of video gaming consoles, or handheld, or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or another interface to the hardware to enable jurisdictionally-compliant gaming, ensuring the location of play and the identity of the player. In another embodiment, the casino provides an entire personal computing device with these devices built in, such as a tablet type computing device, PDA, cell phone or other type of computing device capable of playing system games.

Referring now to FIGS. 2-6, in one implementation of the Sprite Capture and Reproduction System help images may be loaded as "no-texture" images. Then, a single texture may be used to display all help images. Help screens are not performance intensive, but typically occupy a full screen, and thus, significant memory may be saved by using the Sprite Capture and Reproduction System for Help screens. In one embodiment, the use of the Sprite Capture and Reproduction System for Help screens saves an average 30 MB per game.

In another scenario, the Sprite Capture and Reproduction System may be implemented for use with paylines. In this embodiment, the Sprite Capture and Reproduction System loads the payline images as "no-texture" images. Accordingly, in this implementation a single texture may be used to display all paylines. The resulting memory savings of about 70MB for a game with 50 paylines that are 1.5 MB apiece may be achieved. Notably, paylines compress extremely effectively, hence a shared texture object with compressed images for the paylines uses relatively no memory at all in comparison.

With respect to texture management, when using the Sprite Capture and Reproduction System an image loaded with a "no-texture" flag set does not create a texture. Conversely, an image loaded without a "no-texture" flag set does create a texture. In one embodiment of the Sprite Capture and Reproduction System, to render "no-texture" images, the images are added to a "Sprite Canvas" or a member of a descendant of the Sprite Canvas's hierarchy tree.

Figure 2:
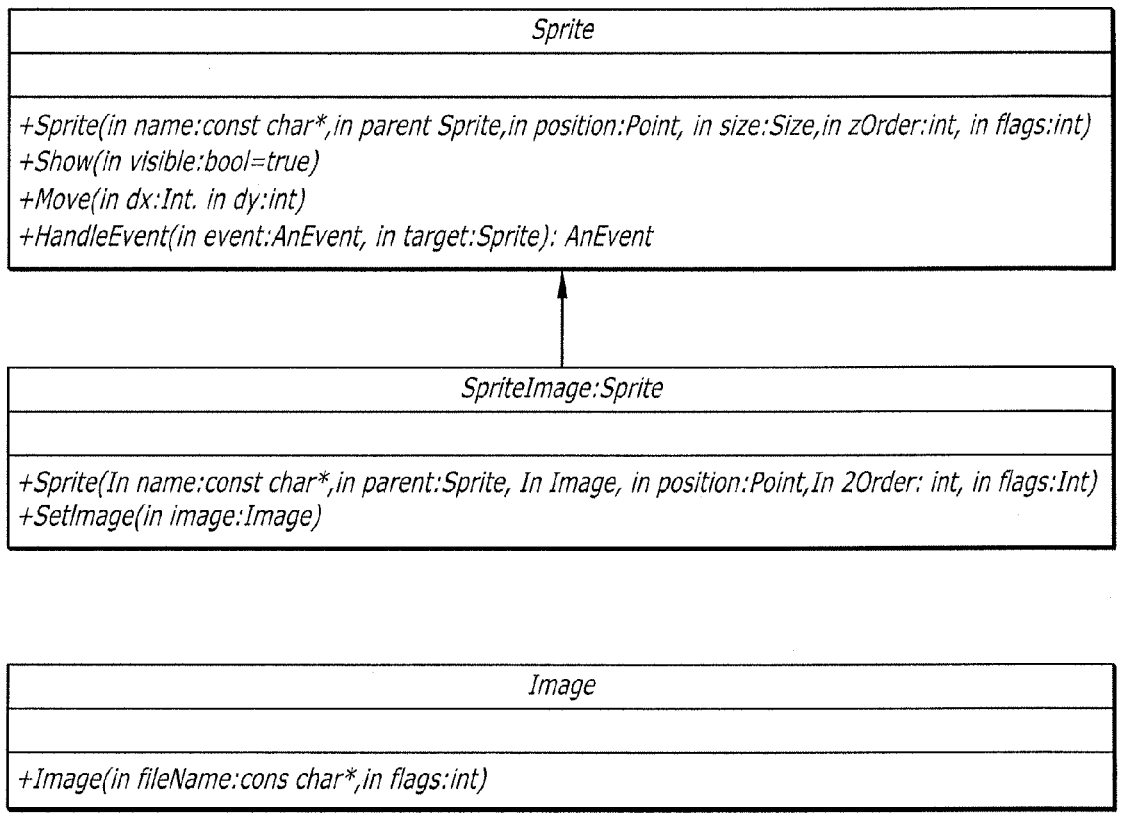
FIG. 2 illustrates a pre-existing Sprite class diagram.
Figure 3:
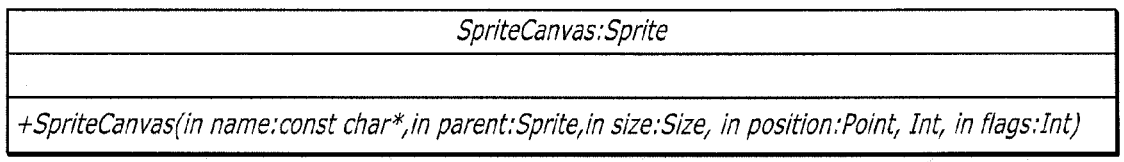
FIG. 3 illustrates a new class SpriteCanvas being added.

Referring now specifically to FIG. 2, a pre-existing Sprite class diagram is shown. With respect to FIG. 3, a new class "Sprite Canvas" is shown being added.

In this embodiment, the "Sprite Canvas" is derived from a Sprite with a new constructor only. The construction of a Sprite Canvas is shown below.

@param name name of the sprite
@param parent parent sprite
@param size size of the canvas
@param position position of the sprite relative to parent.
@param zOrder z order of the sprite
@param flags flags
SpriteCanvas(const char*name, Sprite*parent, Size size, Point position, int zOrder, int flags=visible|transparent|autosize|compressed)

Referring now to another aspect of the Sprite Capture and Reproduction System, implementation of this system and/or method typically results in the reproduction of parent/child relationships between Sprites. Traditionally, a "Sprite Image" utilizes the texture created from the image. When using the Sprite Capture and Reproduction System, since it is possible that an image may not have a texture, there are four cases to consider pertaining to what texture may be used be a Sprite.

Case 1: parent Sprite, Image empty flags—Current usage, rendered to image texture.

Case 2: parent Canvas, Image no-texture—New functionality desired, rendered to canvas texture.

Case 3: parent Sprite, Image no-texture flags—Usage error, image not rendered

Case 4: parent Canvas, Image empty flags—Usage error, blit to canvas texture, texture wasted.

With respect to the background of an image, a "Sprite Canvas" is an initially empty container. Sprites that are added to the canvas fill up the canvas area. Any area not covered by a sprite is transparent.

The Sprite Capture and Reproduction System enables a sprite to be captured and utilized by another sprite. For example, in one non-limiting embodiment, a game has a base game and a bonus screen. When transitioning from the base game to the bonus game, the base game screen is captured to a sprite using the Sprite Capture and Reproduction System. Subsequently, that Sprite may be alpha blended with a bonus game screen Sprite. The alpha blending is much more efficient than requiring the server to loop through all Sprites in the background to order to perform the alpha blending. The blending is also efficient because the captured base game image and the bonus game image can reside on the graphics card with a single paired call to the board to:

basegame->SetAlpha(x), bonusgame->SetAlpha(inverse of x).

The hardware also supports this action.

In one specific, non-limiting embodiment of the Sprite Capture and Reproduction System, the API (application program interface) to capture a Sprite is given as follows:

Captures a sprite to the canvas.
@param sprite sprite to capture.
void SpriteCanvas::SetImage(Sprite*sprite).

In such an embodiment, the input sprite hierarchy is enumerated, capturing the results to the canvas. The resulting image must be stored somewhere, so the image then becomes the background for the canvas, such that the image is written by any area not covered by a child sprite. For convenience, the capture background may be set by an image. Unless a "Set" call is made on a canvas, the background is empty, as already alluded to in the previous section.

Captures an image to the canvas.
@param sprite image to capture.
void SpriteCanvas::SetImage(Image*sprite).

Figure 4:
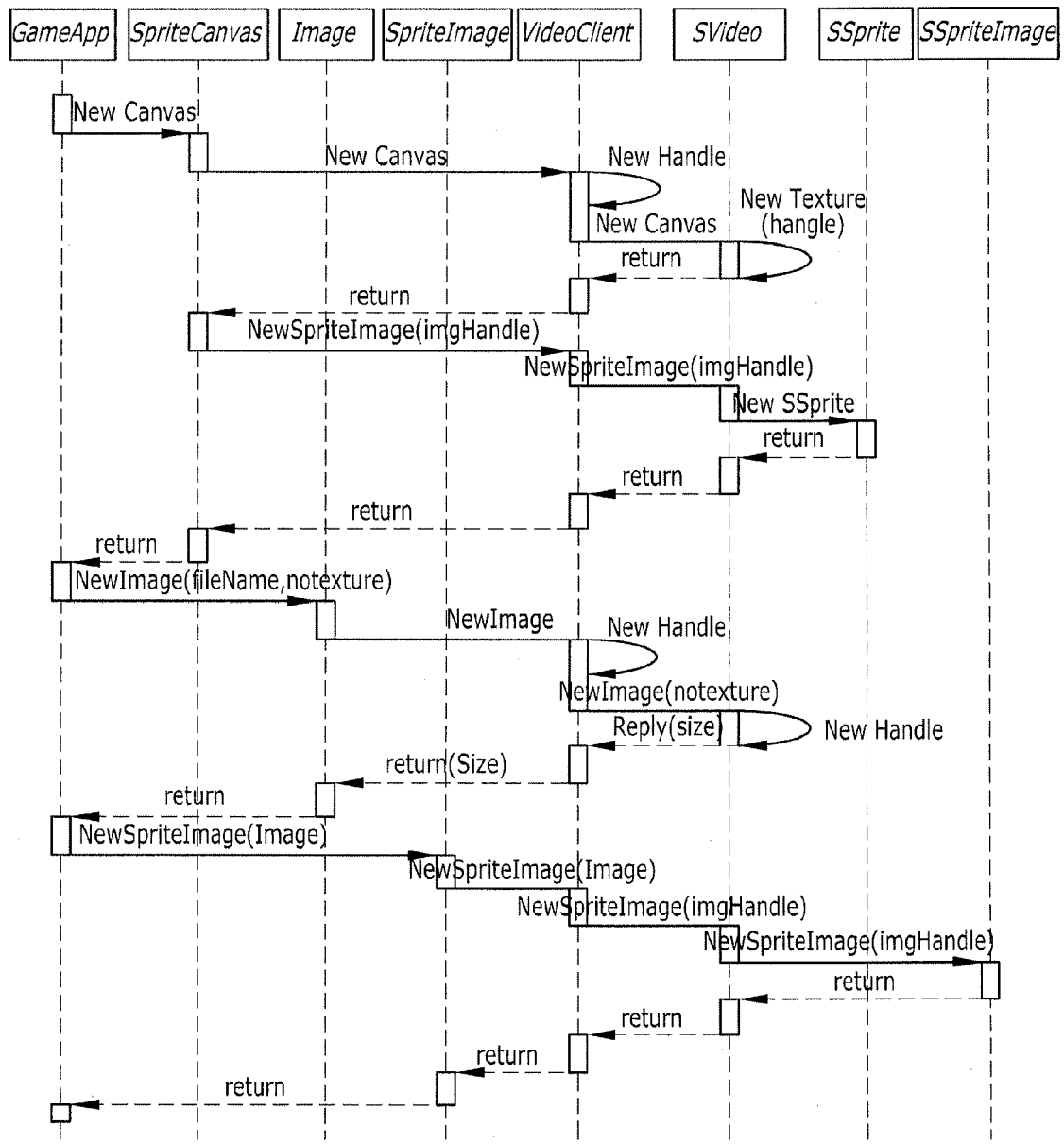
FIG. 4 is a sequence diagram that illustrates a Sprite Canvas API implementation for a simple case of a SpriteCanvas with a single SpriteImage child.

Referring now to FIG. 4, a sequence diagram is shown that illustrates a Sprite Canvas API implementation for a simple case of a Sprite Canvas with a single Sprite Image child. The usage may be as the help screen example, where several "no-texture" Images are loaded and passed to the Sprite: Image::Setimage call. The server implementation basically extends the server side SSprite/SSpriteImage implementation. The canvas sprite is an SSprite member of the root sprite like any other sprite, except it is flagged as a canvas. The SSpriteImage already has a texture that it renders to as a data member.

Children of the Canvas Sprite that are "no-texture" also extend existing implementation. The texture object already has an Image object as a data member. Accordingly, the texture object is modified to not create texture memory if the flag of "no-texture" is passed in. Thus, when a client Image is loaded, the Texture object only creates an Image object. In this manner, the Canvas Sprite may obtain image data for "no-texture" images.

In one embodiment of the Sprite Capture and Reproduction System, the canvas is rendered as an extension of the existing the SSprite Update loop. The SSprite checks if its flags contains "Sprite Canvas." If so, it is a Sprite Canvas. The update then continues by updating all of its children to a surface buffer. When the surface buffer is completely updated, the surface buffer is rendered to the texture. The surface buffer is maintained such that only dirty rectangles are processed for source image decoding and texture blitting.

Figure 5:
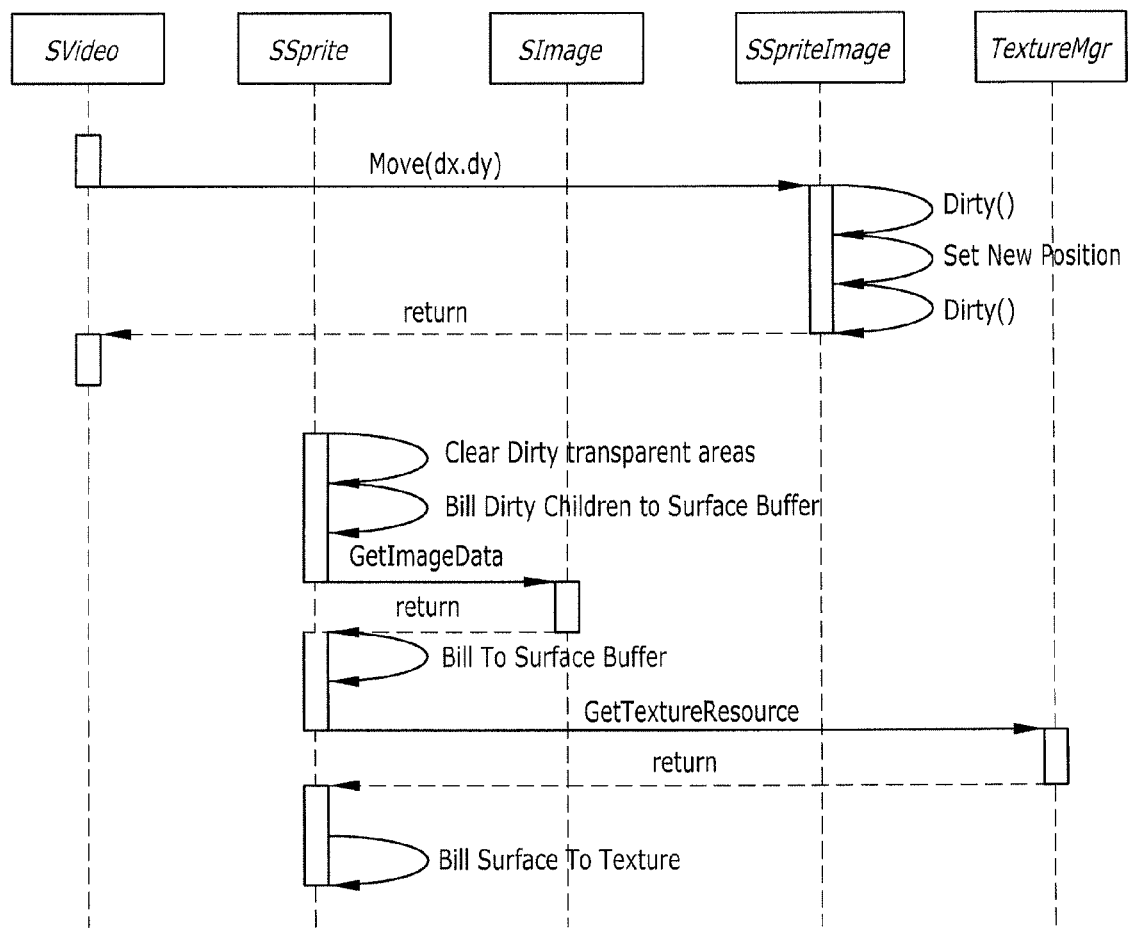
FIG. 5 illustrates a canvas being rendered as an extension of an existing the SSprite Update loop.
Figure 6:
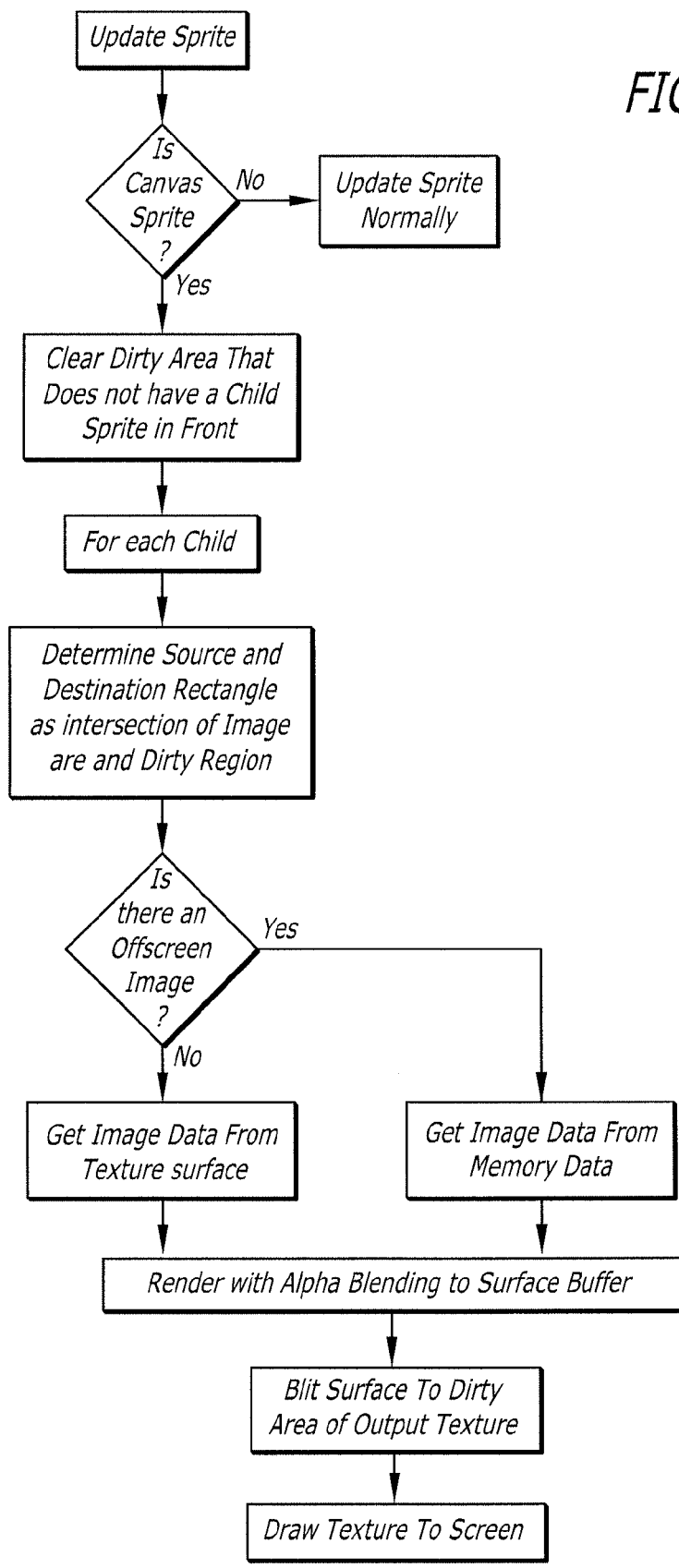
FIG. 6 is flow chart of the logic for the rendering.

Referring now to FIG. 5, a canvas is rendered as an extension of an existing sprite using the SSprite Update loop that is shown. With respect to FIG. 6, a flow chart is shown of the logic for the rendering. The following example of a data schema illustrates how to use the pay screens.

```
/// Load Images
for ( loop = 0; loop(totalPaytablePictures; loop++)
{
iPaysImages [loop] = new Image(filedefs=>PaysScreenFilename(loop),
notexture);
}
// Create Window
// Create our window for displaying history.
sPayWindow = new SpriteWindow ("myPays", null, Rect (40, 60, 1360,
768),
    sGame=>Order + filedefs->PaysZOrder ( ), visible | enabled);
sPayWindow->Enable ( );
sPayWindow->Align(horzLeft, vertTop);
sPayWindow->SetEventHandler (DispatchPaysEvent);
sPayCanvas = new SpriteCanvas ("MyPayCanvas",
    sPayWindow,
    image_ptr->size,
    Point (0, 0),
    sPayWindow->zOrder+2);
sPayMovie = new Sprite Image ("see-pays",
    sPayCanvas,
    image_ptr ,
    Point (0, 0),
    sPayWindow->zOrder + 3,
    visible | autosize);
sPayWindow->Enable ( );
sPayWindow->Align(horzLeft, vertTop);
sPayWindow->SetEventHandler (DispatchPaysEvent);
// Update Pay Screen
sPayMovie->SetImage(iPaysImages [paysCurrentPage]);
```

The following data schema shows payline reproduction.

Figure 7:
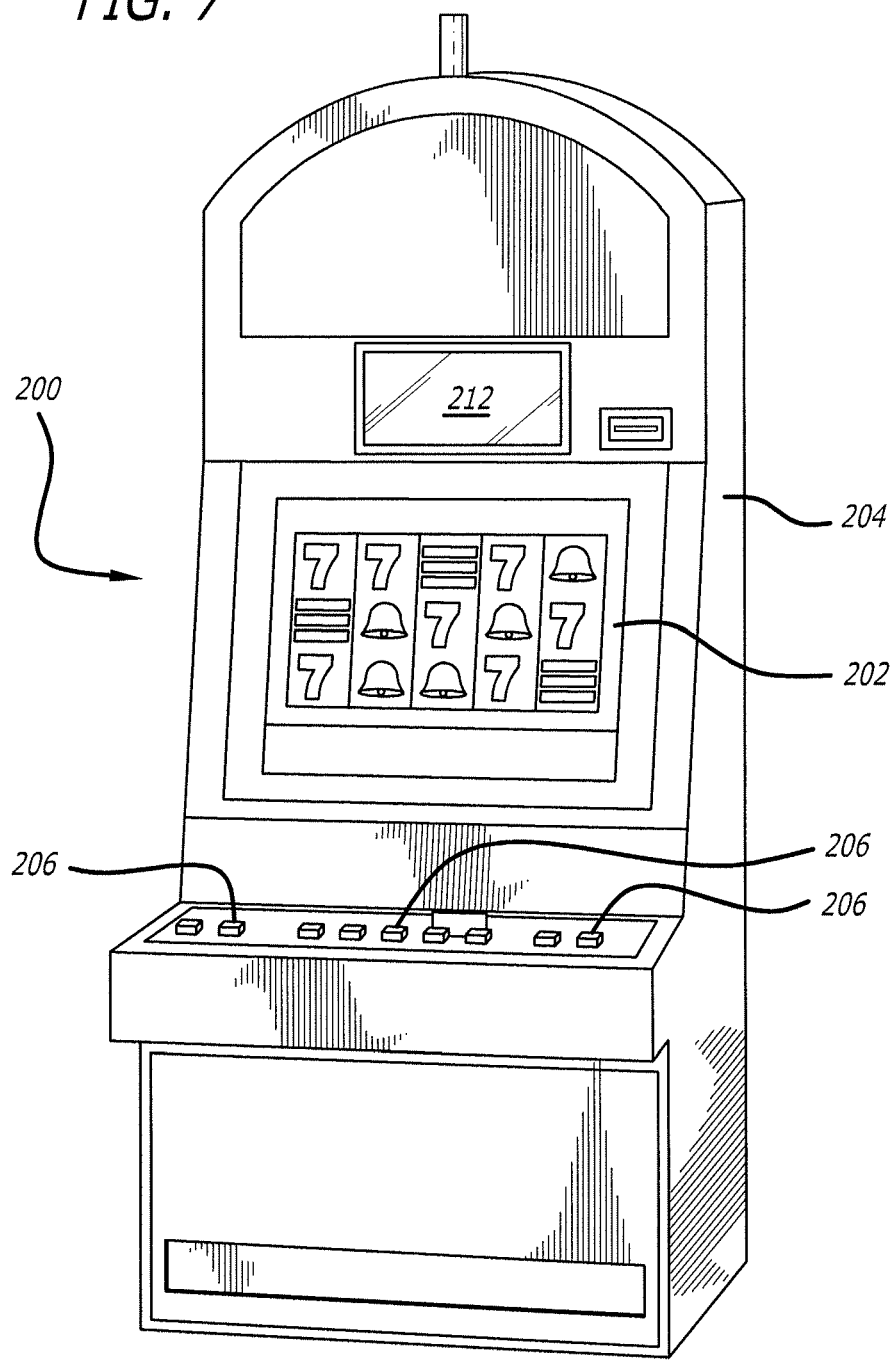
FIG. 7 illustrates one embodiment of a gaming device including the secured module for validating the BIOS.

FIG. 7 illustrates one embodiment of a gaming device including the secured module for validating the BIOS. Turning to FIG. 7, the main cabinet 204 of the gaming machine 200 is a self-standing unit that is generally rectangular in shape. In another embodiment, the main cabinet 204 may be a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 200 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIG. 7, the gaming machine 200 includes a main display 202. According to one embodiment, the main display 202 is a plurality of mechanical reels for presenting a slot-style game. Alternatively, the main display 202 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 202 is a widescreen display (e.g., 16:9 or 16:10 aspect ratio display). In one embodiment, the display 202 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing).

According to one embodiment, the widescreen display 202 may be mounted in the gaming cabinet 204 in a portrait or landscape orientation. In another embodiment, the game display 202 may also include a touch screen or touch glass system (not shown). The touch screen system allows a player to input choices without using any electromechanical buttons 206. Alternatively, the touch screen system may be a supplement to the electromechanical buttons 206.

The main cabinet 204 of the gaming machine also houses a game management unit (not shown) that includes a CPU, circuitry, and software for receiving signals from the player-activated buttons 206 and a handle (not shown), operating the games and transmitting signals to the respective game display 206 and speakers (not shown). Additionally, the gaming machine includes an operating system such as Bally Gaming's Alpha OS, as disclosed in U.S. Pat. No. 7,278,068, which is hereby incorporated by reference.

In various embodiments, the game program may be stored in a memory (not shown) comprising a read-only memory (ROM), volatile or non-volatile random access memory (RAM), a hard drive or flash memory device or any of several alternative types of single or multiple memory devices or structures.

As shown in FIG. 7, the gaming machine 200 includes a plurality of player-activated buttons 206. These buttons 206 may be used for various functions such as, but not limited to, selecting a wager denomination, selecting a number of games to be played, selecting the wager amount per game, initiating a game, or cashing out money from the gaming machine 200. The buttons 206 function inputs mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated by reference. Additionally, other input devices, such as but not limited to, touch pad, track ball, mouse, switches, and toggle switches are included with the gaming machine to also accept player input. Optionally, a handle (not shown) may be "pulled" by a player to initiate a slots-based game.

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

In some embodiments, the gaming machine 200 is part of a gaming system connected to or used with other gaming machines as well as other components such as, but not limited to, a Systems Management Server (SMS) and a loyalty club system (e.g., casino management personnel/system (CMP/CMS)). Typically, the CMS/CMP system performs casino player tracking and collects regular casino floor and player activity data. The gaming system may communicate and/or transfer data between or from the gaming machines 200 and other components (e.g., servers, databases, verification/authentication systems, and/or third party systems).

Figure 8:
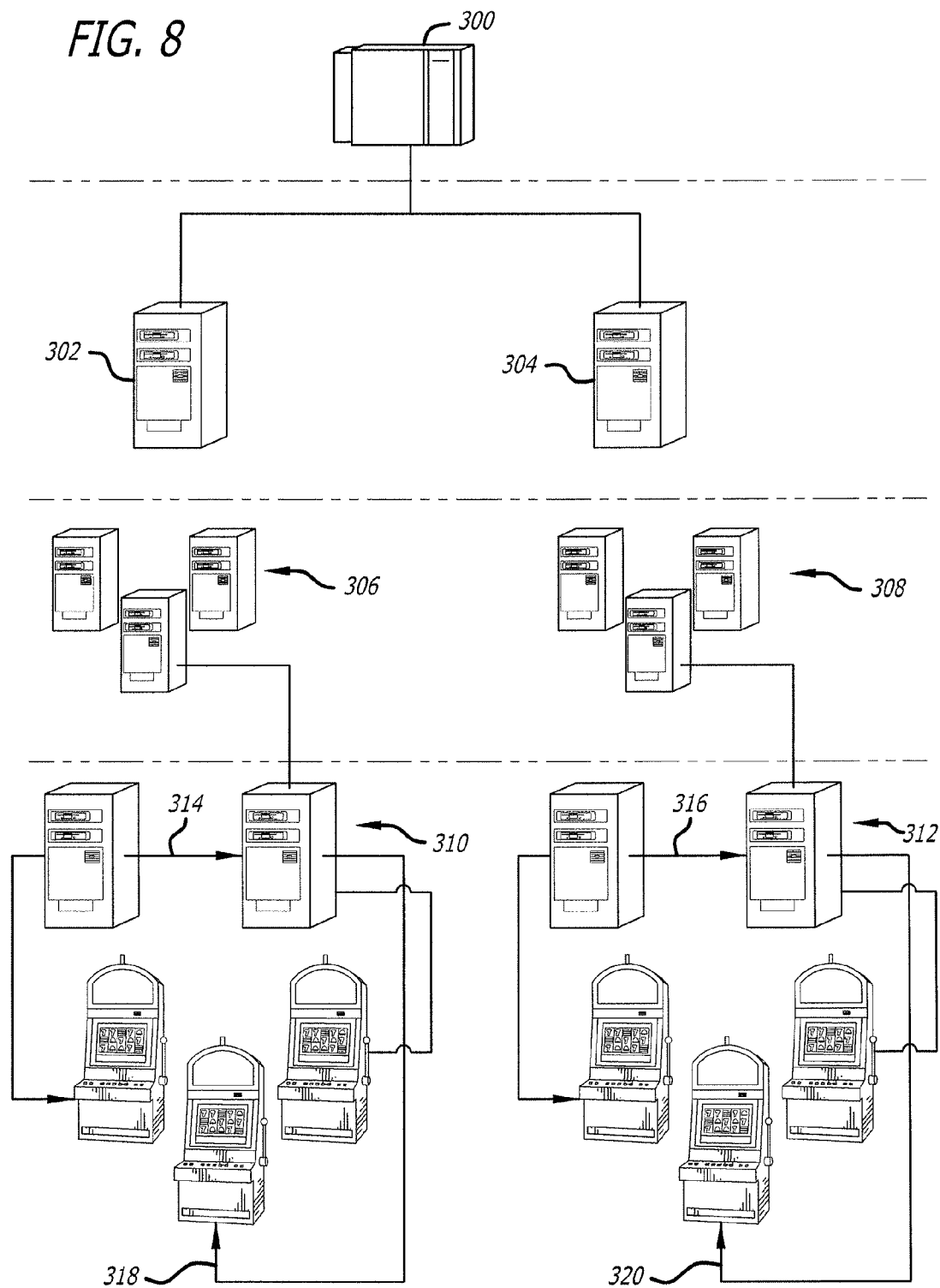
FIG. 8 illustrates one embodiment of a gaming system network including the gaming devices of FIG. 7.

An embodiment of a network that may be used with the system is illustrated in FIG. 8. The example network consists of a top-level, vender distribution point 300 that contains all packages for all jurisdictions, one or more Jurisdiction distribution points 302 and 304 that contain regulator approved production signed packages used within that jurisdiction or sub-jurisdiction, one or more Software Management Points 306 and 308 to schedule and control the downloading of packages to the gaming machine, and one or more Software Distribution Points 310 and 312 that contain regulator approved production signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 101 or 104 or from the gaming servers 103.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A sprite capture and reproduction system for a gaming machine having one or more processors and at least a base game, wherein a sprite is a graphic image that can move within a larger graphic image, the system comprising:
- a sprite canvas API that reduces a number of canvases and textures needed for the base game;
- a sprite capture component, wherein the sprite capture component and a processor enable capture of a compressed sprite in video memory for use as another sprite accessed by a sprite interface; and
- a sprite reproduction component, wherein the sprite reproduction component and a processor enable reproduction of independent animated images displayed on the gaming machine that are combinable in a larger animation;
- wherein an image of the independent animated images is reproduced using the captured sprite;
- wherein a no-texture image is rendered by adding the no-texture image to a member of a descendent of a sprite canvas's hierarchy tree.

2. The system of claim 1, wherein the system does not use additional memory for rendering images using the sprite capture component and the sprite reproduction component.

3. The system of claim 1, wherein the system enables game applications to use an image on the shared texture, thereby reducing the memory usage.

4. The system of claim 1, wherein, when the system loads an image with a no-texture flag set, the system does not create a texture.

5. The system of claim 1, wherein, when the system loads an image without a no-texture flag set, the system does create a texture.

6. The system of claim 1, wherein help images are loaded as no-texture images, and wherein a single texture is used to display all help images.

7. The system of claim 1, wherein the system is implemented for use with paylines.

8. The system of claim 1, wherein the system loads payline images as no-texture images, and wherein a single texture is used to display all paylines.

9. A sprite capture and reproduction system for a gaming machine having one or more processors and at least a base game, wherein a sprite is a graphic image that can move within a larger graphic image, the system comprising:
- a sprite canvas API that reduces a number of canvases and textures needed for the base game;
- a sprite capture component, wherein the sprite capture component and a processor enable capture of a compressed sprite in video memory for use as another sprite accessed by a spite interface; and
- a sprite reproduction component, wherein the sprite reproduction component and a processor enable reproduction of independent animated images displayed on the gaming machine that are combinable in a larger animation, wherein an image of the independent animated images is reproduced using the captured sprite;
- wherein a bonus game uses at least one image of the base game on a shared texture to thus reduce memory usage;
- wherein a no-texture image is rendered by adding the no-texture image to a member of a descendent of a sprite canvas's hierarchy tree.

10. A sprite capture and reproduction method for a gaming machine having one or more processors and at least a base game, wherein a sprite is a graphic image that can move within a larger graphic image, the method comprising:
- providing a sprite canvas API that reduces a number of canvases and textures needed for the base game;
- capturing of a compressed sprite in video memory for use as another sprite accessed by a sprite interface; and
- reproducing independent animated images displayed on the gaming system that are combinable in a larger animation, wherein a discrete texture for each and every image that is loaded is not required;
- wherein an image of the independent animated images is reproduced using a processor, and the captured sprite;
- wherein a bonus game uses at least one image of the base game on a shared texture to thus reduce memory usage;
- wherein a no-texture image is rendered by adding the no-texture image to a member of a descendent of a sprite canvas's hierarchy tree.

\* \* \* \* \*